UNITED STATES PATENT OFFICE.

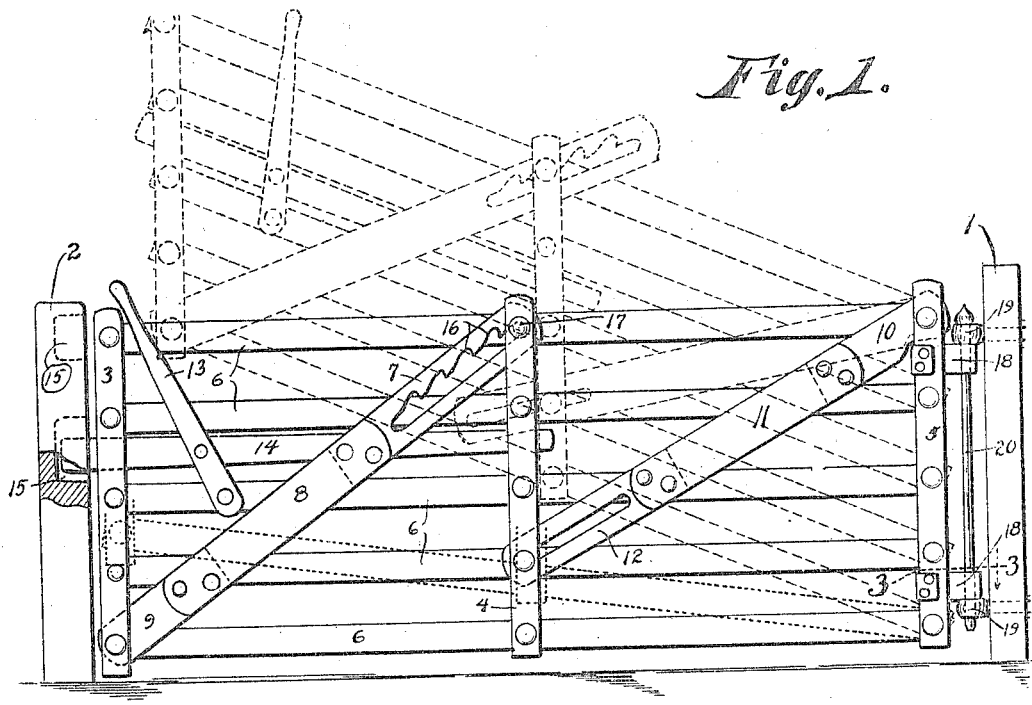
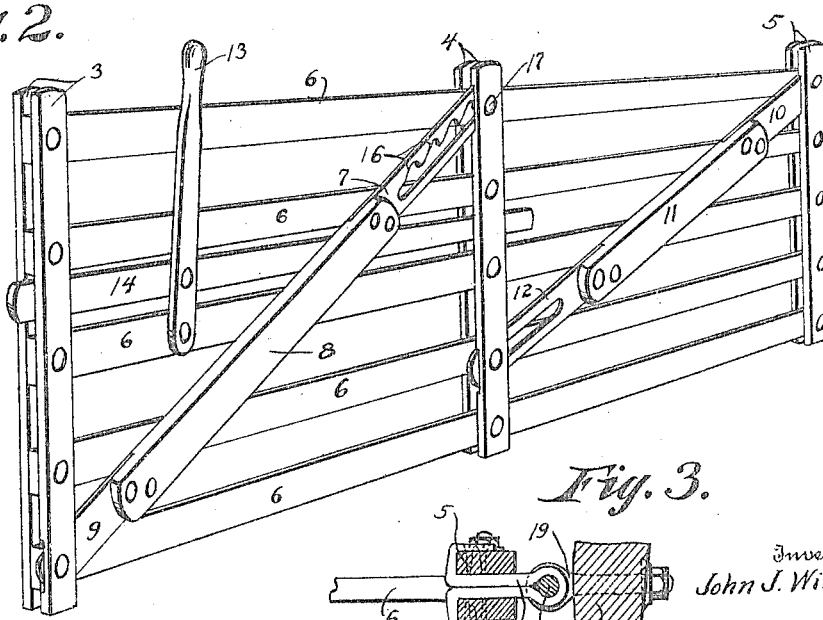
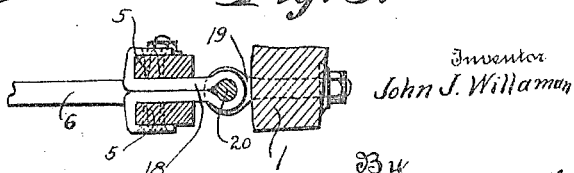

JOHN J. WILLAMAN, OF CANTON, OHIO.

GATE.

No. 811,019.  Specification of Letters Patent.  Patented Jan. 30, 1906.

Application filed June 27, 1905. Serial No. 267,209.

*To all whom it may concern:*

Be it known that I, JOHN J. WILLAMAN, a citizen of the United States, residing at Canton, in the county of Stark and State of Ohio, have invented certain new and useful Improvements in Gates; and I do hereby declare that the following is a full, clear, and exact description of the same, reference being had to the annexed drawings, making a part of this specification, and to the numerals of reference marked thereon, in which—

Figure 1 is a side elevation showing the gate closed and in vertical elevations in dotted lines. Fig. 2 is a detached view of the gate. Fig. 3 is a section on line 3 3, Fig. 1.

The present invention has relation to gates; and it consists in the novel construction hereinafter described, and particularly pointed out in the claim.

Similar numerals of reference indicate corresponding parts in all the figures of the drawings.

In the accompanying drawings, 1 represents the hinge-post, and 2 the latch-post, which posts may be of any desired construction and are held in proper position in the usual manner.

The gate proper consists of a suitable frame of any desired size, and the frame is composed of the upright members 3, 4, and 5, to which upright members are pivotally attached the horizontal gate-bars 6. The object and purpose of pivotally attaching the bars to the vertical members is to provide a means for bringing the frame of the gate at an angle other than a right angle to the post 1, to which post the gate proper is hinged. In some instances it is desired to elevate the free end of the gate and hold the same in elevation for the purpose of allowing small domestic animals to pass under the gate and to bar larger domestic animals, and in other instances it is desirable to elevate the free end of the gate so as to clear the same from obstructions, such as snow-drifts.

At the top portion of the gate proper and between the vertical members 4 is located the notched retaining-bar 7, to which notched retaining-bar is attached the intermediate bar 8, and to the lower end of said bar 8 is securely attached the link 9, which link is pivotally attached to the vertical members 3. To the vertical members 5 is pivotally attached the link 10, to which link is securely attached the bar 11, and to the bar 11 is securely attached the slotted link 12, which slotted link is loosely connected between one of the upright members 4 and one of the gate-bars 6, as illustrated in Figs. 1 and 2.

To one of the gate-bars 6 is pivotally attached the catch-bolt-operating handle 13, to which handle is pivotally attached the catch-bolt 14, which catch-bolt is adapted to move longitudinally between the upright members 3 and 4, and of course when brought into position to latch the gate it is extended beyond the outer edges of the upright members 3 and entered into the proper recess 15, there being two recesses 15, an upper and a lower one, the upper one being for the purpose of latching the gate when brought into its lowermost elevated position and the lower recess being for the purpose of holding the gate when in the position illustrated in full lines, Fig. 1.

The retaining-bar 7 is provided with a series of notches 16, which notches are for the purpose of holding the gate at any desired angle to the post 1 by means of the rivet 17, said retaining-bar being free to move longitudinally when the gate is elevated and when brought to its proper elevation will be held by means of the rivet 17 engaging one of the notches 16.

For the purpose of holding the gate in a rigid condition the links 10 and 12 and the bar 11 are provided. The slotted link 12 is free to move back and forth during the time the gate is elevated or lowered.

It will of course be understood that at the points where the bars 6 and the vertical members 3, 4, and 5 are connected together but a single bolt or rivet should be employed, thereby pivotally attaching the members together, so that the gate proper can be brought to different elevations at its free end.

It will of course be understood that the gate is to be provided with suitable hinge-eyes 18 and 19, which eyes are connected together by the usual pintle-rod 20.

When it is desired to lower the gate proper, or, in other words, bring it into its normal position, the toothed bar is elevated so as to disengage the notch from its rivet, after which the gate is free to be lowered or brought into the position illustrated in full lines, Fig. 1.

Having fully described my invention, what I claim as new, and desire to secure by Letters Patent, is—

The combination of a gate consisting of a frame composed of horizontal bars and vertical members, the vertical members located at the ends of the horizontal bars and intermediate their ends respectively, said parts pivotally connected together, a notched bar located between the intermediate vertical members and adapted to move longitudinally, means for holding the notched bar against longitudinal movement, a pivoted bar provided with a slot at its free end, said notched bar and slotted bar pivoted at their top and bottom ends respectively, a sliding catch-bolt and an operating-handle pivotally attached to said catch-bolt, substantially as and for the purpose specified.

In testimony that I claim the above I have hereunto subscribed my name in the presence of two witnesses.

JOHN J. WILLAMAN.

Witnesses:
J. A. JEFFERS,
F. W. BOND.